UNITED STATES PATENT OFFICE.

FERDINAND STARK, OF NEW YORK, N. Y., ASSIGNOR OF ONE-THIRD TO EDWARD N. DICKERSON, OF SAME PLACE.

METHOD OF PRESERVING FOODS.

SPECIFICATION forming part of Letters Patent No. 619,446, dated February 14, 1899.

Application filed June 9, 1898. Serial No. 682,990. (No specimens.)

*To all whom it may concern:*

Be it known that I, FERDINAND STARK, a subject of the Emperor of Germany, residing at New York city, in the county and State of New York, have invented a new and useful Method or Process of Preserving Meat and Similar Perishable Food Products, of which the following is a specification.

The process consists in first cutting the meat or other food product to be treated preferably into slices of a considerable thickness, then soaking the slices of meat or other food product in ammonia for a considerable period of time—about one hour—and finally thoroughly drying the same in a drying-room, oven, or other suitable place. I have found that meat and other food products treated in this manner can be effectively preserved for a great length of time.

When it is desired to use the preserved article, it is put in hot or boiling water for such a length of time as to permit it to regain its original shape and odor of freshness.

During the process and in that stage in which the meat is being soaked or treated with ammonia a certain amount of juice from the meat will be retained by the ammonia. The combined juice and ammonia is then treated to drive off the ammonia, the resultant being meat-juice, which will also be preserved for a long period of time.

Preferably the ammonia used in this process is the hydroxid of ammonia ($NH_4OH$) or ($NH_3H_2O$) commercially known as spirits of ammonia, concentrated ammonia, caustic ammonia, or ammonia-water.

What I claim as my invention is—

The method of preserving meat and other perishable food products, which consists first in slicing the product to be treated, then soaking or otherwise treating it with ammonia and finally drying the treated product, substantially as described.

In testimony whereof I have signed my name to this specification in the presence of two subscribing witnesses.

FERDINAND STARK.

Witnesses:
ANTHONY GREF,
GEO. E. CRUSE.